Figure 1:
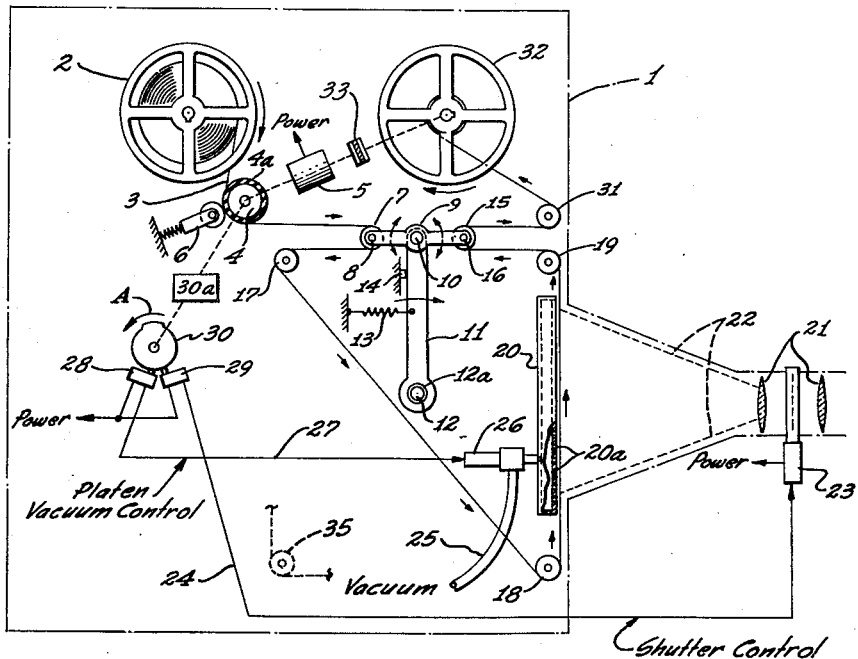

Nov. 7, 1961  P. ROSENBLUM  3,007,368
FILM TRANSPORT MECHANISM
Filed Oct. 14, 1957

Philip Rosenblum
INVENTOR

Attorney 3,007,368
FILM TRANSPORT MECHANISM
Philip Rosenblum, Sierra Madre, Calif., assignor to Hycon Mfg. Company, Pasadena, Calif., a corporation of Delaware
Filed Oct. 14, 1957, Ser. No. 689,814
4 Claims. (Cl. 88—18)

My present invention relates generally to cameras and more particularly to a new and useful film transport mechanism for cameras having film flattening means such as a vacuum platen.

Vacuum platens are employed in large aerial cameras, for example, to provide a plane surface against which a section of film can be flattened by creating a vacuum in the platen structure. The focal plane of the lens system in the camera coincides with the flattened film such that a true image is accurately exposed on the film when the camera shutter is operated.

A vacuum platen is frequently used where the desired format for each picture frame is large, and it is difficult to position the film smoothly against a flat surface. This is particularly true when the film is derived off a roll of film and the film is generally in motion most of the time, except during exposure of a frame. An intermittent motion film driving mechanism is necessary in most cameras to permit the taking of successive pictures in sequence on a roll of film. Fresh film must first be drawn into the format and film motion stopped before vacuum can be applied through the platen, following which the shutter may be operated to produce a picture. This means that there exist abrupt starts and stops each cycle which not only cause aggravated wear on the system but require sudden drains of power.

The film drawn for each picture frame must be positively indexed each cycle to prevent overlapping of pictures or double exposures. Perforated film and complex gear mechanisms are required in cameras having conventional film transport mechanisms to insure that the film is properly positioned each cycle before vacuum is applied and shutter operated in sequence. It is apparent that positive indexing involves use of materials and apparatus which can be relatively expensive.

It is an object of my invention to provide a novel film transport mechanism for a camera including a vacuum platen, in which the film reels can rotate at a constant speed while successive frames of pictures can be taken in sequence, whereby abrupt disturbances in the driving mechanism is reduced to a minimum.

Another object of this invention is to provide a film transport mechanism wherein film without perforations can be used without sacrificing positive indexing of film.

Another object of the invention is to provide a film transport mechanism wherein essentially no gears or complex devices are required for positive film indexing.

A further object of my invention is to provide an extremely reliable and accurate film transport mechanism of simple and inexpensive construction.

Briefly, and in general terms, the foregoing and other objects are preferably accomplished by providing in a camera having a vacuum platen and vacuum control means therefor, a lever arm rotatably mounted on a fixed axis at one end and spring loaded normally to an index position, the other end of the lever arm rotatably supporting a symmetrical cross arm at the middle thereof and the ends of the cross arm mounting rollers, the film metered off a supply reel being first looped around one roller, then passed over the face of the vacuum platen located between suitable guide rollers, and then looped around the other roller and passed onto a takeup reel. The film is metered off the supply reel by a constant speed motor driving a metering roller and the takeup reel can be also driven by the motor except through a slip clutch. A single step cam is mechanically coupled to the metering roller and causes, at the proper time, application of vacuum to the platen which flattens and stops the section of film over the platen face and then operates the camera shutter to take a picture. While the section of film is stopped and held by the vacuum platen, the lever arm rotates on its fixed axis to take up film being driven off the supply reel and at the same time supply film to the takeup reel. Vacuum is removed following shutter operation and the film is permitted to move freely, allowing the lever arm to return to its index position. The cycle is repeated after a predetermined length of film is moved by the metering roller each time.

A slightly different version of the system consists of replacing the slip clutch with an independent series type motor for driving the take-up reel. This use of an independent series type motor produces an exceptionally even film tension throughout the system.

Figure 2:
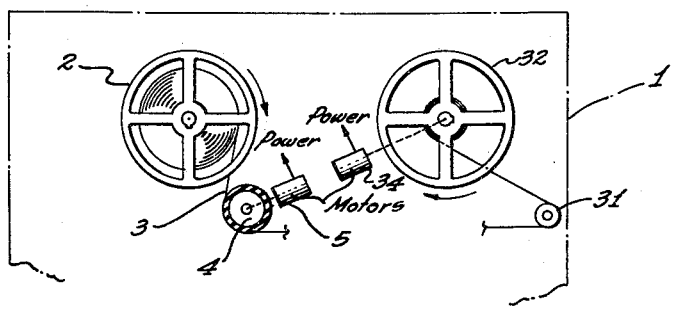

My invention possesses other objects and features, some of which together with the foregoing, will be set forth in the following detailed description of a preferred embodiment of my invention, and the invention will be more fully understood by reading the description with joint reference to the attached drawings, in which:

FIGURE 1 is a drawing, in partially diagrammatic form, of a film transport mechanism of preferred construction for a camera; and FIGURE 2 is a fragmentary view of the drawing of FIGURE 1 illustrating a slightly modified version of my invention.

The individual elements comprising a preferred embodiment of my invention shown in FIGURE 1 are generally conventional elements in themselves. Camera 1 includes a supply reel 2 carrying a large sized (9.5 inches wide, for example) roll of light sensitive film 3 which is passed over metering roller 4 driven by a constant speed motor 5. A conventional rotary friction brake (not shown) provides a light braking action on the rotation of supply reel 2 to prevent unrestrained unraveling of film 3 off reel 2. Slippage between film 3 and the metering roller 4 is prevented by pressure roller 6 which presses the film 3 against metering roller 4. To increase traction between the film and roller, the roller may have a pliable covering 4a, composed, for example, of rubber.

The film 3 is then looped—half wrapped—about a roller 7 which is rotatably supported on axle 8 mounted through one end of a symmetrical cross arm 9. The cross arm 9 is also rotatably mounted at the middle thereof on axle 10 which is, in turn, supported on one end of lever arm 11. The other end of lever arm 11 is supported through bearing 12a on a fixed shaft 12 for free rotary motion about the axis of shaft 12. The lever arm 11, however, is constrained normally to an index position (as shown) by tension spring 13 which pulls lever arm 11 against the properly located fixed stop 14. The other end of the symmetrical cross arm 9 rotatably carries a roller 15 on axle 16 similar to roller 7 on axle 8.

The film 3 looped about roller 7 is then passed around the fixed guide rollers 17, 18 and 19 in sequence, passing over the face of vacuum platen 20 which is located in this instance between guide rollers 18 and 19. The vacuum platen 20 is of conventional construction and comprises a generally hollow metal plate having a pattern of vacuum slots or holes 20a in the face of the platen 20 to hold the section of film over the face thereof in correct registry during exposure when the platen is energized, such that the image focused by the lens 21, as indicated by dash lines 22, will fall on a flat section of film correctly located in the focal plane of the lens. Picture format is, for example, 9 inches by 18 inches.

A shutter 23 is located between the components of lens 21 and can be one like the camera shutter mechanism described and claimed in the copending application of Russell E. Prentice, Serial No. 680,566, filed August 27, 1957. All that is required is that the shutter 23 operate once in response to an electrical pulse appearing on line 24. Similarly, vacuum provided through hose 25 to the vacuum platen 20 is electrically controlled by solenoid valve 26 by means of an electrical pulse of proper duration supplied on line 27. Vacuum can be supplied by a vacuum pump (not shown) or from differential pressure as is available in pressurized aircraft compartments.

The application of vacuum to platen 20 and the actuation of shutter 23 are controlled by switches 28 and 29, respectively. Both of the switches 28 and 29 are controlled by a single step cam 30 which is mechanically connected to the metering roller 4 driven by motor 5. The cam 30 is rotated through speed variable means 30a, which can be a reduction gear, in the direction indicated by arrow A and switch 28 is positioned just before switch 29 so that vacuum can be built up adequately before the shutter 23 is operated. The mechanical coupling means 30a of cam 30 to metering roller 4 is designed to cause cam 30 to operate the valve 26 each time a length of film is metered which is slightly longer than the length of the photograph over the face of the platen 20. Direct coupling of cam 30 to metering roller 4 is of course possible by providing a metering roller of sufficient diameter to permit this. The width of the step on cam 30 and the positioning of switches 28 and 29 is such that after vacuum is built up sufficiently to suck the section of film 3 against platen 20 to hold that section of film stationary, switch 29 is actuated to operate the shutter 23, and then vacuum is removed (solenoid valve 26 de-energized).

The film 3 is looped around roller 15 after leaving guide roller 19 and is then passed about guide roller 31 and onto takeup reel 32. Takeup reel 32 is driven by the motor 5 through a slip clutch 33. Slip clutch 33 is necessary since the film roll on takeup reel 32 gradually increases in diameter, requiring higher rotary reel 32 speeds at the beginning than later. A minor modification of this drive consists of the replacement of slip clutch 33 with an independent motor 34, which is preferably a series type motor connected as shown in FIGURE 2 to drive the takeup reel 32, and providing a variable torque output for the varying diameter of film 3 on the takeup reel 32. A series motor would provide greater torque output at slow speeds and less torque at higher speeds. This produces a very even film tension throughout the system.

Operation of my invention can be best described with reference to FIGURE 1. The film 3 moves through the system from supply reel 2 onto takeup reel 32 as indicated by the small arrows beside the film. The condition of the film transport mechanism illustrated in FIGURE 1 is, say, some time after a previous exposure and the film 3 is being moved into position for another, new exposure. Vacuum does not exist in the vacuum platen 20 at this time and motor 5, through metering roller 4 and slip clutch 33, causes a length of film (and in the system) to be moved across the face of the platen 20.

The single step rise on cam 30 closes switch 28 after the correct amount of film 3 has been drawn across the face of the platen 20. Solenoid valve 26 has power applied to it for the angular width of the rise on cam 30 and opens the valve 26 such that a vacuum is created in the platen structure 20. This causes development of sufficient suction to pull the film 3 against platen 20 and hold the film 3 stationary. Since film is still being spooled by takeup reel 32 by motor 5 through slip clutch 33 (or by motor 34 for the configuration of FIGURE 2), lever arm 11 rotates clockwise to supply film to takeup reel 32. At the same time, rotation of lever arm 11 on bearing 12a and lateral movement of roller 7 takes up an equal amount of film 3 being spooled off from supply reel 2 by action of the metering roller 4. The cross arm 9 rotates on axle 10 to keep these two lengths of film 3 equalized. The force on cross arm 9 due to the film tension is normally equal to twice the film tension acting to the left and twice the film tension acting to the right. Therefore, the force causing the cross arm 9 to move is essentially zero since the forces are acting in opposite directions. The loss in film tension incurred by the film 3 passing over rollers 17, 18 and 19 causes a slight differential tension of film 3 which tends to move cross arm 9 to the right. Spring 13, therefore, is strong enough to overcome this differential force and provide a positive index position.

The time duration for applying vacuum (width of the rise on cam 30 and speed of rotation) must, of course, be limited to a short enough period that does not permit lever arm 11 from moving an excessive amount of film to cause the mechanism to bottom out wherein the roller 15 bottoms against one of the guide rollers 19 or 31, for example. The spring constant of spring 13 is selected to allow clockwise rotation of lever arm 11 without causing excessive tension in the film 3 by the winding action of takeup reel 32.

Switch 29 is closed by the rise on cam 30 after sufficient vacuum has been developed in platen 20 (after the so-called "dead time") to draw and hold the section of film against platen 20 stationary. Closure of switch 29 by the rise on cam 30 provides a pulse to shutter 23 on line 24 which operates the shutter 23 once. It should be noted that the shutter 23 can include a differentiating network through which the pulse on line 24 is passed, and only the initial rise of the pulse is used to trigger the shutter 23. Thus, the shutter 23 can be rapidly readied for another exposure without fear of overlapping or double exposures. The output speed of motor 5 which actually drives the cam 30 determines the frequency of taking successive pictures.

After operation of shutter 23 and exposure of the stationary section of film held against the face of platen 20, the rise on cam 30 rotates off switch 28, opening the switch 28 and de-energizing solenoid valve 26 which closes valve 26, removing the vacuum source from platen 20. Air quickly rushes through some of the holes 20a and the film is then free to move across platen 20, which permits lever arm 11 to be returned to stop 14 by the force of spring 13 in readiness for the next cycle of operation.

Although generally unnecessary in actual practice, the valve 26 structure can be of such conventional type that, when the solenoid is energized, the solenoid plunger moves a seal from a vacuum port over to close an atmosphere port, so that the platen 20 cavity which was previously connected to the atmosphere is now only connected to the vacuum hose 25 through the vacuum port. When the solenoid is de-energized, the seal is moved from the atmosphere port over to close the vacuum port such that the platen 20 cavity is again connected directly with atmosphere. This ensures quick release of the film section off the platen 20 face and can increase the release speed of the film from the platen 20.

When the film is permitted to move freely over the face of platen 20 by removal of the vacuum source from the platen, the force resulting in pulling lever arm 11 clockwise is removed, and the spring 13 can return the lever arm 11 back to index position. The same amount of film 3 being drawn off supply reel 2 is substantially taken up on takeup reel 32 and the shortening of the film loop around roller 7 due to the lateral movement of roller 7 to the left is equally compensated by a corresponding movement by roller 15 and lengthening of its loop of film. Film is accurately moved throughout the system and no gears or mechanism for positive indexing is required. Film without perforations can be used to advantage.

For wide loops of film 3, the cross arm 9 is actually comprised of a pair of cross arms bracketing and supporting the rollers 7 and 15 for free rotation between the cross arms. The two cross arms can be indicated by the same numeral 9 in FIGURE 1, but only one, the front, cross arm is visible as shown. Lever arm 11, in this instance, rotatably supports axle 10 at the middle of the length of the axle 10.

It is clear that the lens 21 can be pointed in other directions by re-positioning of guide roller 18 and correspondingly re-locating the platen 20 to a proper position. For example, if guide roller 18 was located as indicated by guide roller 35, the lens 21 can point to the left. Platen 20 is then positioned between guide rollers 17 and 35 (18). If guide roller 35 is an additionally added roller, the lens 21 can point downward and platen 20 would be located between guide rollers 35 and 18. This latter arrangement is particularly suitable for aerial cameras used in aerial survey work, for example.

From the above description it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

In order to comply with the statute, my invention has been described in language more or less specific as to structural features. It is to be understood, however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

I claim:

1. A camera, comprising: a supply reel carrying a roll of large size film; a takeup reel for receiving film from said supply reel; means for moving the film from said supply reel onto said takeup reel, said film moving means including a constant speed motor, a metering roller driven by said motor for drawing film off said supply reel, and a slip clutch connecting said motor to drive said takeup reel; a shutter; a vacuum platen provided with a vacuum line and having the film moving over the platen face; means for focusing an image on the platen face; means for controlling application of sufficient vacuum through said line to fully flatten and firmly stop an immediate section of film passing over the platen face from moving and for operating said shutter in the camera after said section of film is flattened and stopped, to expose said section of film in register with the focused image, said means for controlling application of vacuum and operating said shutter including a cam having a single step rise cooperating with sequentially disposed control means for energizing said platen to develop sufficient vacuum to stop said section of film and then operating said shutter, said cam being mechanically coupled to said film moving means; and means for maintaining a substantially even film tension throughout the system at all times, said latter means including a lever arm rotatably mounted on a fixed axis at one end and spring loaded normally to an index position, a cross arm rotatably supported at the middle thereof on the other end of said lever arm, a roller respectively mounted on each end of said cross arm, and means for guiding the film whereby the film drawn off said supply reel is looped around one roller to produce a force on said lever arm normally in one direction, passed over the platen face, then looped around the other roller to produce another force on said lever arm normally in an opposite direction to the former force, and spooled onto said takeup reel, said lever arm being rotated on the fixed axis thereof against the spring tension by the spooling action of said takeup reel whenever said platen is sufficiently energized to stop film movement thereover, said cross arm and rollers being moved by said lever arm to take up film being drawn off said supply reel and to supply film being spooled by said takeup reel.

2. A camera, comprising: a supply reel carrying a roll of large size film; a takeup reel for receiving film from said supply reel; means for moving the film from said supply reel onto said takeup reel, said film moving means including a constant speed motor, a metering roller driven by said motor for drawing film off said supply reel, and a series type motor connected to drive said takeup reel; a shutter; a vacuum platen provided with a vacuum line and having the film moving over the platen face; means for focusing an image on the platen face; means for controlling application of sufficient vacuum through said line to said platen to fully flatten and firmly stop an immediate section of film passing over the platen face from moving and for operating said shutter in the camera after said section of film is flattened and stopped, to expose said section of film in register with the focused image, said means for controlling application of vacuum and operating said shutter including a cam having a single step rise cooperating with sequentially disposed control means for energizing said platen to develop sufficient vacuum to stop said section of film and then operating said shutter, said cam being mechanically coupled to said film moving means; and means for maintaining a substantially even film tension throughout the system at all times, said latter means including a lever arm rotatably mounted on a fixed axis at one end and spring loaded normally to an index position, a cross arm rotatably supported at the middle thereof on the other end of said lever arm, a roller respectively mounted on each end of said cross arm, and means for guiding the film whereby the film drawn off said supply reel is looped around one roller to produce a force on said lever arm normally in one direction, passed over the platen face, then looped around the other roller to produce another force on said lever arm normally in an opposite direction to the former force, and spooled onto said takeup reel, said lever arm being rotated on the fixed axis thereof against the spring tension by the spooling action of said takeup reel whenever said platen is sufficiently energized to stop film movement thereover, said cross arm and rollers being moved by said lever arm to take up film being drawn off said supply reel and to supply film being spooled by said takeup reel.

3. Film transport mechanism for a camera, comprising: a supply reel carrying a roll of large size film; a takeup reel for receiving film from said supply reel; means for moving the film from said supply reel onto said takeup reel; a vacuum platen provided with a vacuum line and having the film moving over the platen face; means for controlling application of sufficient vacuum through said line to said platen to fully flatten and firmly stop an immediate section of film passing over the platen face from moving; and means for maintaining a substantially even film tension throughout the system at all times, said latter means being independently responsive to maintain substantially even film tension continuously during full film movement and during the stoppage of an immediate section of film, and including a lever arm rotatably mounted on a fixed axis at one end and spring loaded normally to an index position, a cross arm rotatably supported at the middle thereof on the other end of said lever arm, a roller respectively mounted on each end of said cross arm, and means for guiding the film whereby the film drawn off said supply reel is looped around one roller to produce a force on said lever arm normally in one direction, passed over the platen face, then looped around the other roller to produce another force on said lever arm normally in an opposite direction to the former force, and spooled onto said takeup reel, said lever arm being rotated on the fixed axis thereof against the spring tension by the spooling action of said takeup reel whenever said platen is sufficiently energized to stop film movement thereover, said cross arm and rollers being moved by said lever arm to take up film being drawn off said supply reel and to supply film being spooled by said takeup reel.

4. Film transport mechanism for a camera, comprising: a supply reel carrying a roll of film; a takeup reel for receiving film from said supply reel; means for moving the film from said supply reel onto said takeup reel; a vacuum platen provided with a vacuum line and having the film moving over the platen face; means for controlling application of sufficient vacuum through said line to fully flatten and firmly stop an immediate section of film passing over the platen face from moving and for operating a shutter in the camera after said section of film is flattened and stopped, to expose said section of film; and means for maintaining a substantially even film tension throughout the system at all times, said latter means being independently responsive to maintain substantially even film tension continuously during full film movement and during the stoppage of an immediate section of film, and including a lever arm rotatably mounted on a fixed axis at one end and spring loaded normally to an index position, a cross arm rotatably supported at the middle thereof on the other end of said lever arm, a roller respectively mounted on each end of said cross arm, and means for guiding the film whereby the film drawn off said supply reel is looped around one roller to produce a force on said lever arm normally in one direction, passed over the platen face, then looped around the other roller to produce another force on said lever arm normally in an opposite direction to the former force, and spooled onto said takeup reel, said lever arm being rotated on the fixed axis thereof against the spring tension by the spooling action of said takeup reel whenever said platen is sufficiently energized to stop film movement thereover, said cross arm and rollers being moved by said lever arm to take up film being drawn off said supply reel and to supply film being spooled by said takeup reel.

References Cited in the file of this patent

UNITED STATES PATENTS

| | | |
|---|---|---|
| 629,582 | Mason | July 25, 1899 |
| 710,339 | Reichenbach | Sept. 30, 1902 |
| 2,173,996 | Becker | Sept. 26, 1939 |
| 2,521,153 | Doyle | Sept. 5, 1950 |
| 2,713,814 | Sonne et al. | July 26, 1955 |
| 2,771,814 | Isom | Nov. 27, 1956 |
| 2,796,009 | Doyle et al. | June 18, 1957 |

FOREIGN PATENTS

| | | |
|---|---|---|
| 10,474 | Great Britain | of 1895 |
| 165,869 | Australia | Nov. 3, 1955 |